United States Patent [19]

Nagatomo et al.

[11] Patent Number: 5,097,664
[45] Date of Patent: Mar. 24, 1992

[54] METHOD FOR CONTROLLING EXHAUST SYSTEM OF VEHICLE

[75] Inventors: Takahisa Nagatomo, Tochigi; Chikashi Kurihara, Gunma, both of Japan

[73] Assignee: Calsonic Corporation, Tokyo, Japan

[21] Appl. No.: 600,475

[22] Filed: Oct. 19, 1990

[30] Foreign Application Priority Data

Oct. 23, 1989 [JP] Japan .................................. 1-273747

[51] Int. Cl.⁵ ............................................ F02B 27/02
[52] U.S. Cl. ........................................ 60/273; 60/312; 181/236; 181/254
[58] Field of Search .................... 60/312, 274, 273; 181/236, 254

[56] References Cited

U.S. PATENT DOCUMENTS

| 4,665,692 | 5/1987 | Inaba | 60/312 |
| 4,901,528 | 2/1990 | Saigo | 60/312 |
| 4,926,636 | 5/1990 | Tadokoro | 60/312 |
| 5,014,817 | 5/1991 | Takato | 60/312 |

*Primary Examiner*—Douglas Hart
*Attorney, Agent, or Firm*—Caesar, Rivise, Bernstein, Cohen & Pokotilow, Ltd.

[57] ABSTRACT

There is provided a method for controlling an exhaust system of a vehicle including a controller for controlling an open-close operation of an on-off valve which is provided at an intermediate portion of one of a pair of exhaust pipes arranged in parallel and communicating with an exhaust port of an engine depending upon running condition of the vehicle. The control method includes three control patterns different from each other, i.e., a first control pattern during an accelerated running condition of the vehicle, a second control pattern during a constant-speed running of the vehicle, and a third control pattern during a decelerated running condition of the vehicle.

20 Claims, 7 Drawing Sheets

Fig. 2
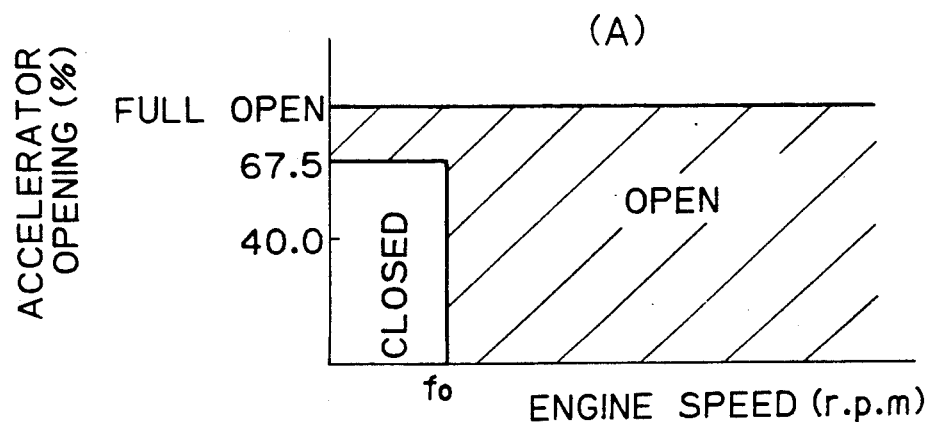
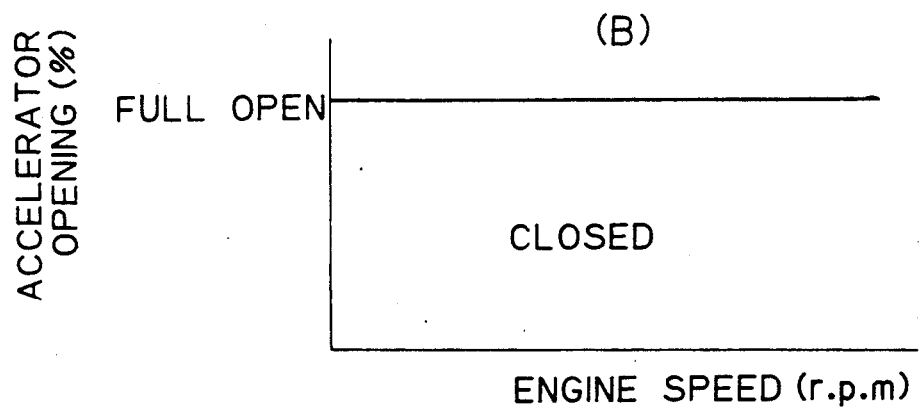
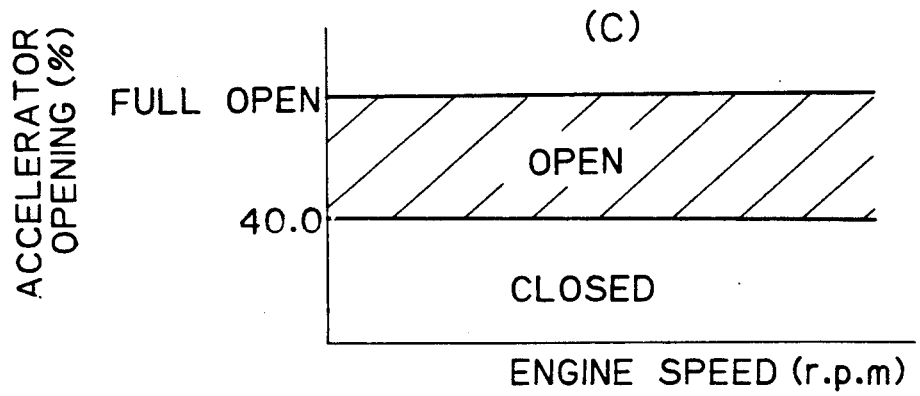

Fig. 5
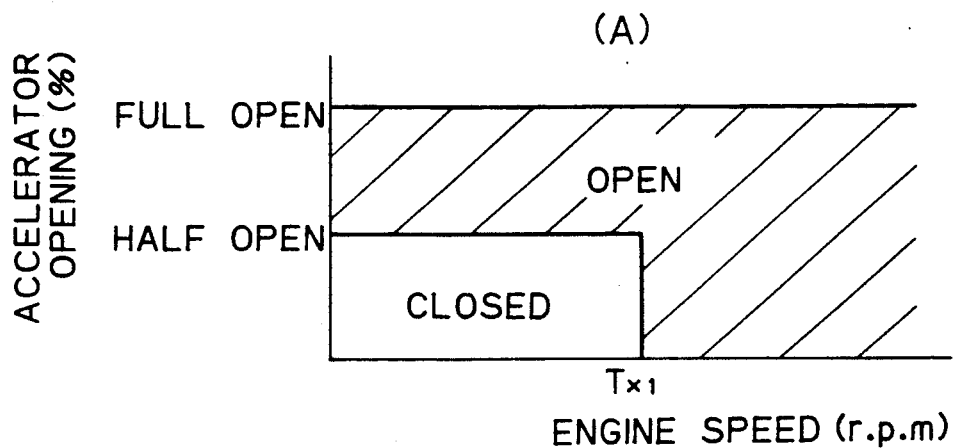
(A)
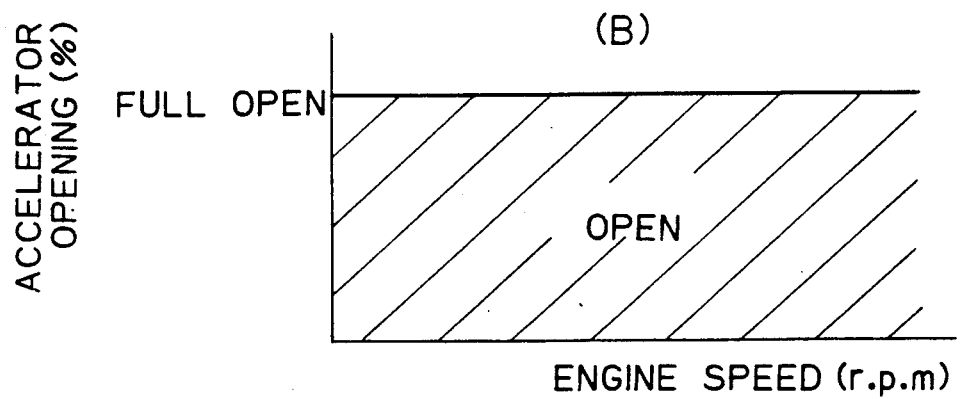
(B)
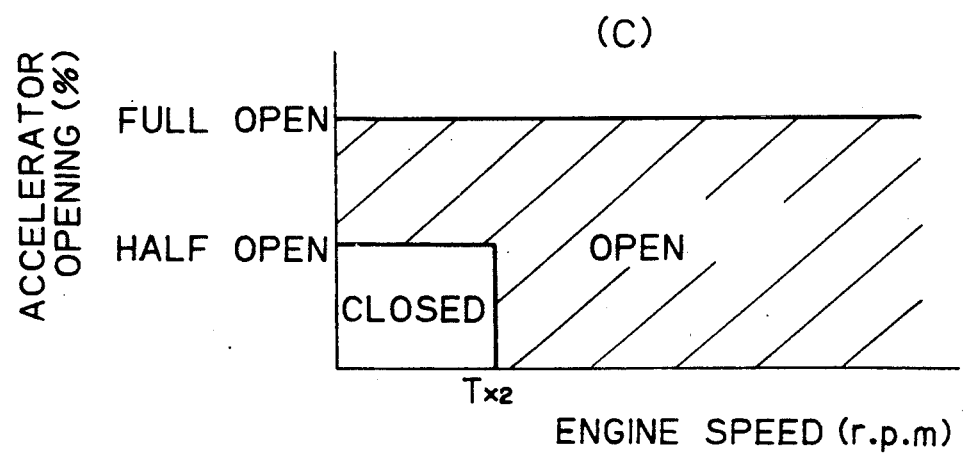
(C)

METHOD FOR CONTROLLING EXHAUST
SYSTEM OF VEHICLE

BACKGROUND OF THE INVENTION

1. Field of the Invention

The present invention relates to a method for controlling an exhaust system of a vehicle by regulating area of a flow passage in an exhaust pipe depending upon operational condition of the vehicle. More particularly, the present invention relates to a method for assigning an optimum control pattern to an on-off valve disposed in an exhaust system for discharging exhaust gas from a driving engine of a vehicle depending upon running condition of the vehicle, thus increasing the engine output and/or reducing a noisy sound from the engine to a desired degree.

2. Description of Related Art

The volume of exhaust gas discharged from a driving engine of a vehicle will constantly vary depending upon an engine speed and/or running condition of the vehicle. If an engine is provided with an exhaust system the construction of which remains unchanged regardless of varying running condition of the vehicle, the engine would represent insufficient efficiency and/or a noisy sound resulting from exhaust gas from the engine would become louder.

That is, if the engine is provided with an exhaust system which is effective enough to damp noisy sound from the engine during a relatively small quantity of exhaust gas is discharged from the engine, such exhaust system may cause a large resistance to the exhaust gas when the quantity of exhaust gas becomes greater, thus restricting the engine from producing higher output. On the contrary, and if the engine is provided with an exhaust system which does not cause a very high resistance to a flow of exhaust gas during a large quantity of exhaust gas is discharged from the engine, such an exhaust system would be incapable of reducing or damping a noisy sound to a desired level.

Under the circumstances, an exhaust system of a variable construction which is designed to vary the area of an exhaust gas flow passage depending upon running condition of a vehicle, such as shown in Japanese Utility Model Public Disclosure No. 62-54210, has been proposed and is employed in some vehicle engines.

Such an exhaust system of variable construction includes, as shown in FIG. 7, a pair of exhaust pipes 1 and 2 each communicating with an exhaust port of an engine and arranged in parallel with each other, an on-off valve 3 disposed at an intermediate portion of one exhaust pipe 1, and a controller 4 for controlling the on-off valve 3 depending running condition of a vehicle.

In FIG. 7, reference numeral 5 designates an actuator which actuates to open or close the on-off valve 3 in accordance with a signal from the controller 4 and numeral 6 a silencer which receives flow of exhaust gas from the engine for reducingly damping components of a noisy sound accompanying the exhaust gas. The pair of exhaust pipes 1 and 2 are incorporated in the silencer 6 so as to constitute outlet conduits thereof.

A signal indicative of an accelerator opening and a signal indicative of an engine speed are input to the controller 4. The controller 4 controls an open-close operation of the on-off valve 3 in accordance with the above two signals, as shown in FIG. 8.

Specifically, the on-off valve 3 is opened when the engine speed is very high (for example, no less than 4,600 r.p.m), or when the engine speed is relatively high (for example no less than 2,500 r.p.m.) and at the same time the accelerator opening is relatively large (for example, no less than 40%), whereas the on-off valve 3 is closed in any other cases.

As a result, when a large quantity of exhaust gas is discharged from the engine, the area of a flow passage of exhaust gas becomes greater so as to prevent occurrence of a large amount of resistance against the exhaust gas flow, whereby maintaining sufficient amount of engine output. On the contrary, and when a relatively small quantity of exhaust gas is discharged from the engine, the area of the flow passage of exhaust gas is restricted so as to reducingly damp noisy sound to a desired degree.

It has been found, however, that the prior art exhaust system of variable construction for a vehicle having the construction and function as shown above is incapable of satisfactorily functioning when the engine is rapidly accelerated.

That is to say, the controller 4 is designed to detect the engine speed and the accelerator opening so as to open the on-off valve 3 when the engine speed is instantaneously increased in response to a rapid acceleration motion. The on-off valve 3, however, will not be opened until after the engine speed has reached 2,500 r.p.m. even if the accelerator is fully opened. Thus, it is unavoidable for such a prior art exhaust system to represent a slight time-lag until the on-off valve 3 actually opens.

During such a time-lag, the volume of exhaust gas discharged from the engine continuingly increases. The area of the flow passage of exhaust gas however remains narrow, thus forming a considerable amount of resistance to the exhaust gas flow. Accordingly, the amount of back pressure within the engine increases, thereby restricting the engine from producing higher output.

If, on the other hand, it is intended to minimize the above time lag by setting a predetermined level of the engine speed to commence the opening operation of the on-off valve 3 at a lower point, it would be possible to obtain an increased output of the engine upon rapid acceleration operation. This may cause, however, a change in the damping characteristics of the silencer when the engine operates at a lower speed slightly higher than such a predetermined level, thus resulting in resonance noise due to occurrence of resonant vibration of the vehicle chamber by means of discharge sound and vibration of the exhaust system, whereby causing insufficient silencer effect at a lower engine speed.

SUMMARY OF THE INVENTION

The present invention is aimed at solving the above inconveniences experienced in prior art.

It is therefore one object of the invention to provide a method for controlling an exhaust system of a vehicle which permits high engine output when the vehicle is rapidly accelerated.

Another object of the invention is to provide a method for controlling an exhaust system of a vehicle which permits high engine output when the vehicle is rapidly accelerated, without specifically shortening a change-over time for an on-off valve.

A still further object of the invention is to provide a method for controlling an exhaust system of a vehicle which permits the exhaust system to exert satisfactory silencing effect upon engine running at lower speeds.

In order to achieve the above object, the method for controlling an exhaust system of a vehicle according to the present invention includes a first control pattern upon an accelerated running condition of the vehicle, a second control pattern during a constant-speed running condition of the vehicle, and a third control pattern upon a decelerated running condition of the vehicle, the first, second and third control patterns being different from each other.

The change-over action between the control patterns is carried out instantaneously by means of a vehicle speed signal, for example. For example, and when the vehicle is rapidly accelerated, a control pattern appropriate to such a rapid acceleration mode, i.e., a control pattern which enlarges the area of an exhaust gas passage, will be conducted from the beginning before the engine attains a predetermined speed, thus causing the engine to produce satisfactory output. On the other hand, and when the vehicle is decelerated, a control pattern appropriate to such a deceleration mode, i.e., a control pattern which reduces the area of the exhaust gas passage, will be conducted from the beginning of the deceleration mode before the engine speed decreases to a predetermined level, thus facilitating satisfactory silencing effect.

In order to achieve the above object, another method for controlling an exhaust system of a vehicle in accordance with the invention includes a fourth control pattern when the vehicle speed is no less than a predetermined level and no kick-down motion of an accelerator has been made, a fifth control pattern when the kick-down motion of the accelerator has been made, and a sixth control pattern when the vehicle speed is less than the predetermined level and no kick-down motion of the accelerator has been made, the fourth, fifth and sixth control patterns being different from each other.

The change-over action between the control patterns is carried out instantaneously by means of a vehicle speed signal and a kick-down signal, for example. For example, and when a kick-down motion of the accelerator has been made so as to obtain rapid acceleration of the vehicle, a control pattern appropriate to such a rapid acceleration mode, i.e., a control pattern which enlarges the area of an exhaust gas passage, will be conducted from the beginning of the rapid acceleration before the engine attains a predetermined speed, thus causing the engine to produce satisfactory output. On the other hand, and when no kick-down motion has been made, change-over action between the control patterns is carried out on the basis of a predetermined level of the engine speed and a predetermined value of the accelerator opening which correspondingly define an area effective to cause engine braking at different vehicle speeds. Thus, the area of exhaust gas flow passage will be reduced when the engine speed and the accelerator opening are less than a predetermined value at a given vehicle speed whereby satisfactory silencing effect for exhaust noise can be obtained in all area in which engine braking is effective.

BRIEF DESCRIPTION OF THE DRAWINGS

The aforesaid and another objects of the invention, as well as the advantageous features thereof, may be understood with reference to the following detailed description of an illustrative embodiment of the invention, taken together with the accompanying drawings in which:

FIGS. 2 (A), (B) and (C) illustrate several control patterns in accordance with the first control method of the invention;

FIGS. 5 (A), (B) and (C) illustrate several control patterns in accordance with the second control method of the invention;

DETAILED DESCRIPTION

Several embodiments of a control method for an exhaust system of a vehicle in accordance with the present invention will be explained in detail hereinbelow with reference to the attached drawings.

Figure 1:
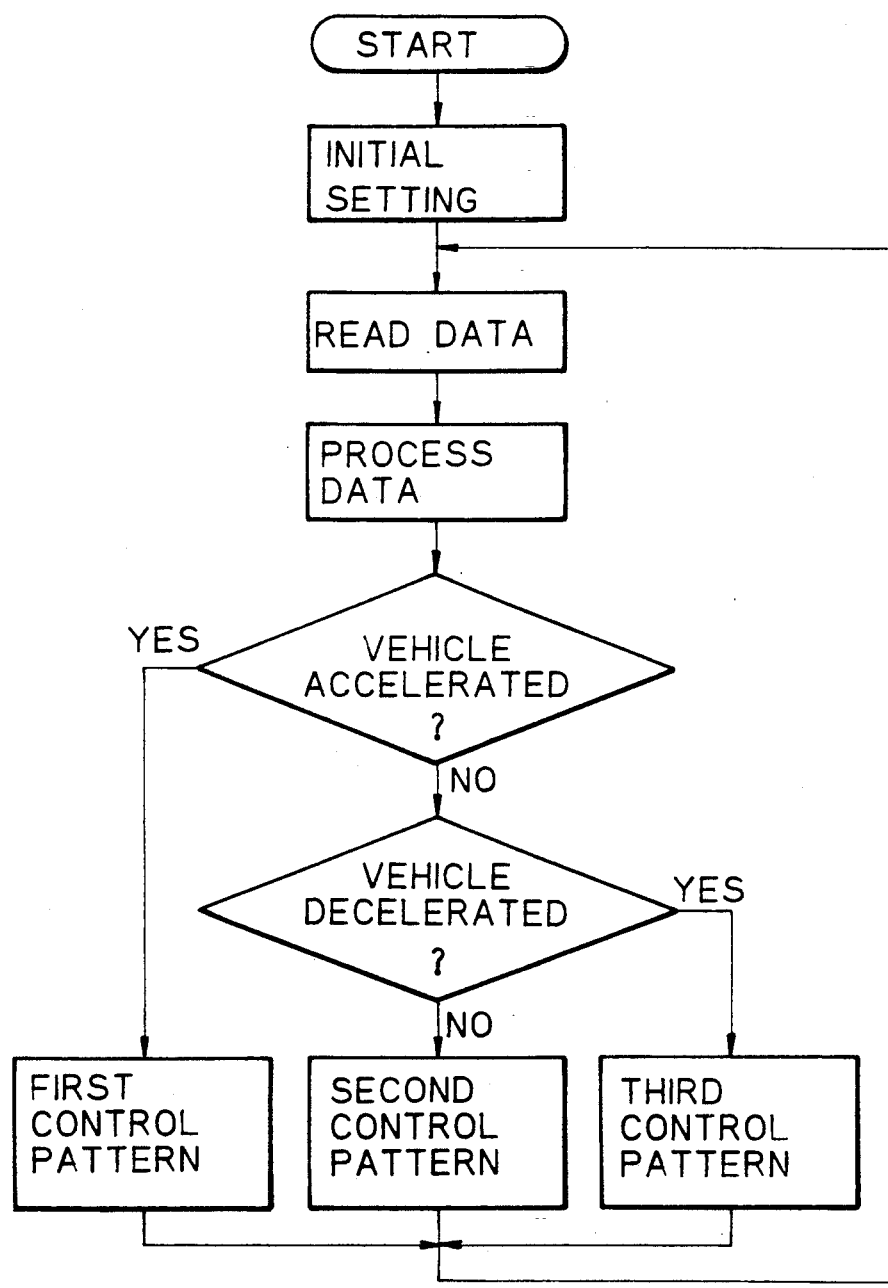
FIG. 1 is a flow chart illustrating a first control method of the invention.

FIG. 1 is a flow chart illustrating the first control method of the invention as described in claim 1. FIGS. 2 (A), (B) and (C) illustrate several patterns in accordance with the first control method of the invention, while FIG. 3 is a block diagram of a control unit for conducting the first control method of the invention.

Figure 7:
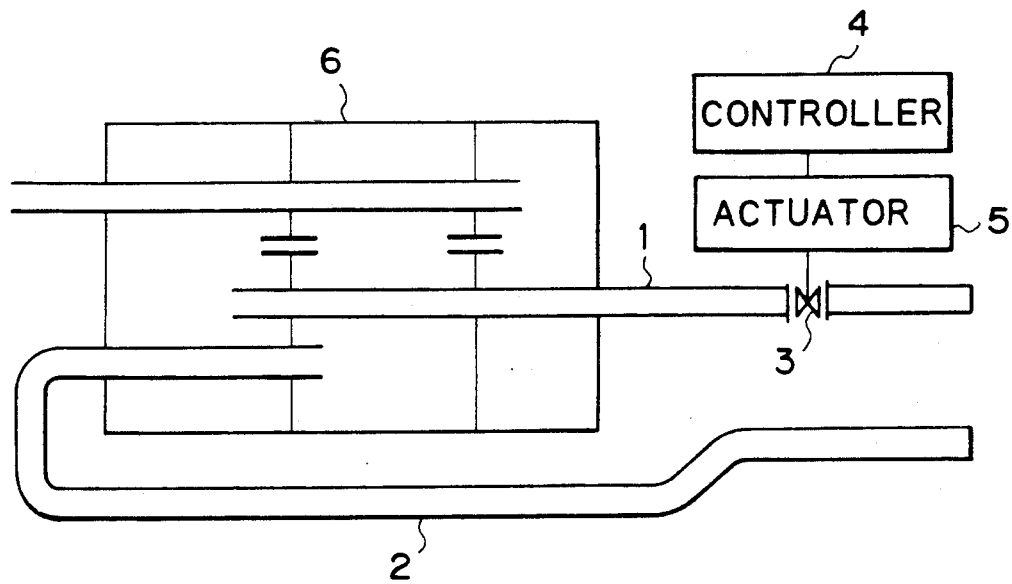
FIG. 7 is a simplified diagrammatic illustration showing one example of the exhaust systems controlled by the control method of the invention.
Figure 8:
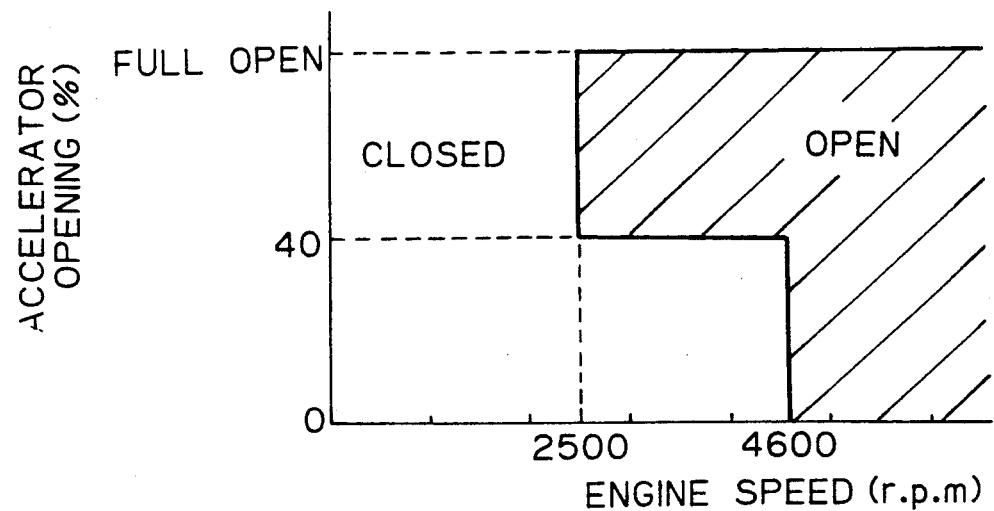
FIG. 8 illustrates a control pattern in accordance with a prior art control method.

An exhaust system intended to be controlled in accordance with a control method of the invention includes, as shown in FIG. 7 for example, a pair of exhaust pipes 1 and 2 arranged in parallel with each other and each being adapted for communication with an exhaust port of an engine, an on-off valve 3 disposed at the intermediate portion of the exhaust pipe 1, an actuator 5 for controlling on-off operation of the on-off valve 3, and a controller 4 for transmitting a driving signal to the actuator 5 so as to open or close the on-off valve 3.

Figure 3:
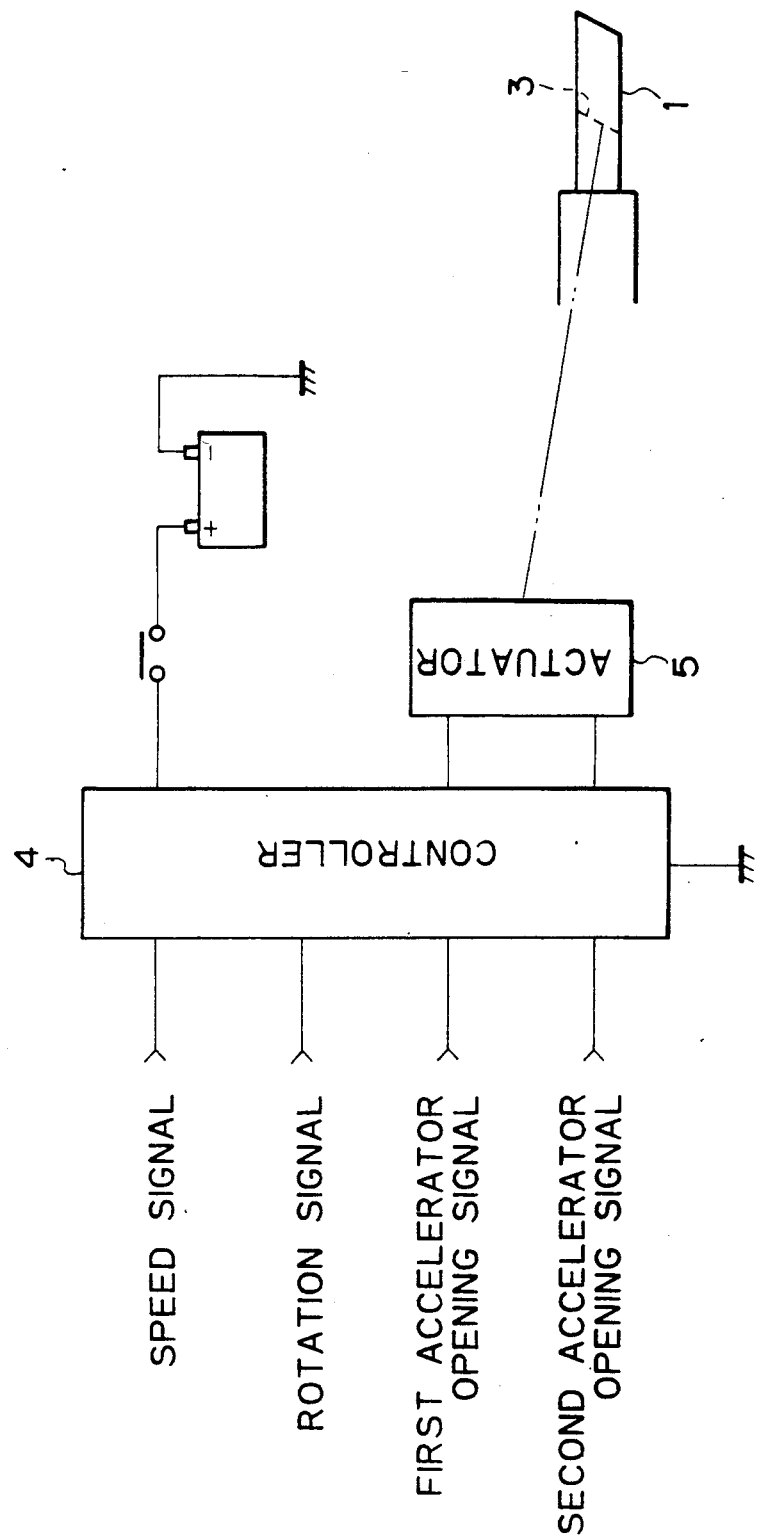
FIG. 3 is a block diagram of a control unit for conducting the first control method of the invention.

For the purpose of conducting the control method of the invention and as shown in FIG. 3, the controller 4 is input by a speed signal indicative of a vehicle speed, a rotation signal indicative of rotation numbers of the engine, a first opening signal indicating the fact that the opening of an accelerator exceeds 50%, and a second opening signal indicating the fact that the opening of the accelerator exceeds 75%. The controller 4 is designed so as to generate a control signal based on these input signals for transmitting the same to the actuator 5 for driving the on-off valve 3.

That is to say, the controller 4 controls to vary the operational condition of the on-off valve 3 in three different control patterns shown in FIGS. (A), (B) and (C) in accordance with the above several signals.

First, and when it is determined that the vehicle is in an accelerated condition based on the above signals, the controller assigns the first control pattern of FIG. 2 (A) to the on-off valve 3.

Accordingly, and during an accelerated condition of the vehicle, the on-off valve 3 will be opened when the engine speed is equal to or above a predetermined value, fo in FIG. 2 (A), or when the engine speed is less than the predetermined value but the opening of the accelerator is relatively high, for example 67.5% or above.

As a result, the on-off valve 3 always remains open to restrict built-up of an increased back pressure within the engine so as to maintain a desired engine output upon acceleration, except when the engine speed is relatively low and the opening of the accelerator is also relatively low.

When the engine speed is relatively low and the opening of the accelerator is also relatively low, the on-off valve 3 will closed, since, in such a case, discharge volume of the exhaust gas is small and hence, even with a relatively narrow exhaust passage, build-up of a high back pressure within the engine is not expected. Thus, it is able to prevent occurrence of a noisy sound which might occur when the on-off valve 3 is opened in spite of a relatively small exhaust gas volume.

When the vehicle is in a constant-speed running condition, the controller 4 assigns the second control pattern of FIG. 2 (B) to the on-off valve 3, whereby the on-off valve 3 in the exhaust pipe 1 is kept closed, regardless of the engine speed or the accelerator opening.

Since a very high engine output is not required during a constant-speed running of the vehicle, shortage of the engine output would not occur even if the on-off valve 3 is closed, thus achieving satisfactory silencing effects.

When the vehicle is in a decelerated condition, the controller 4 assigns a third control pattern of FIG. 2 (C) to the on-off valve 3, whereby the on-off valve 3 will be opened only when the opening of the accelerator reaches or exceeds a predetermined value, for example 40% or more, and regardless of the engine speeds.

A situation in which the opening of the accelerator is maintained at a relatively high degree even though the vehicle is in a decelerated condition might occur when a driver of the vehicle slightly releases an accelerator pedal during the running of the vehicle at a relatively low gear ratio so as to cause relatively weak engine braking force. In such a case, the on-off valve 3 will be opened, whereby a stream of exhaust gas of a relatively large quantity is distributed into the pair of the exhaust pipes 1 and 2 so as to reduce flow rate of the exhaust gas, thus maintaining desired engine output, simultaneously preventing the exhaust gas from causing noisy sound.

When the vehicle is in an decelerated condition and the opening of the accelerator is relatively low, such as a case when it is intended to obtain a relatively large engine braking force, the on-off valve 3 will be closed so as to vary the damping characteristic, thus preventing occurrence of noisy sound due to the exhaust gas volume and vibration.

Figure 4:
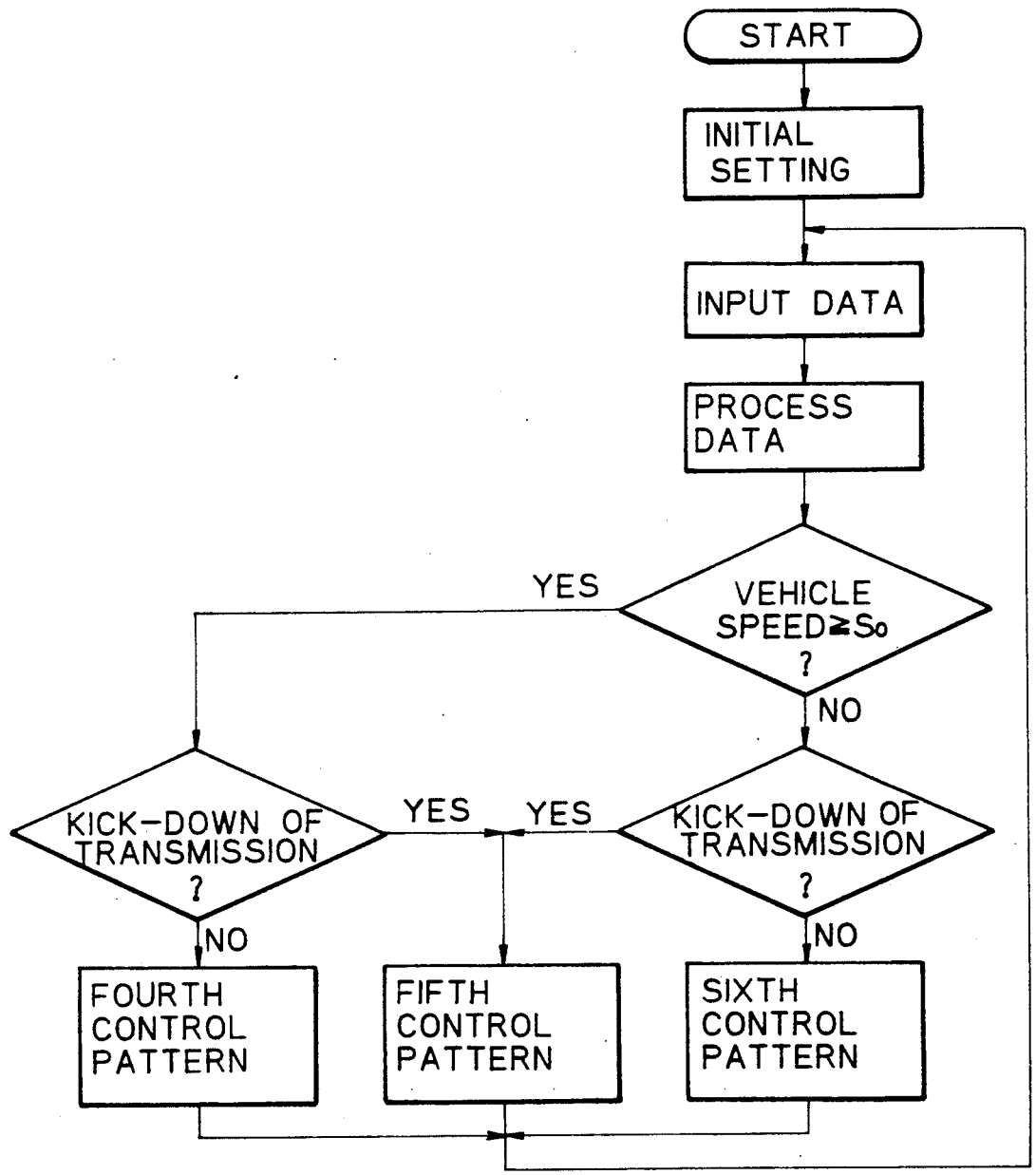
FIG. 4 is a flow chart illustrating a second control method of the invention.
Figure 6:
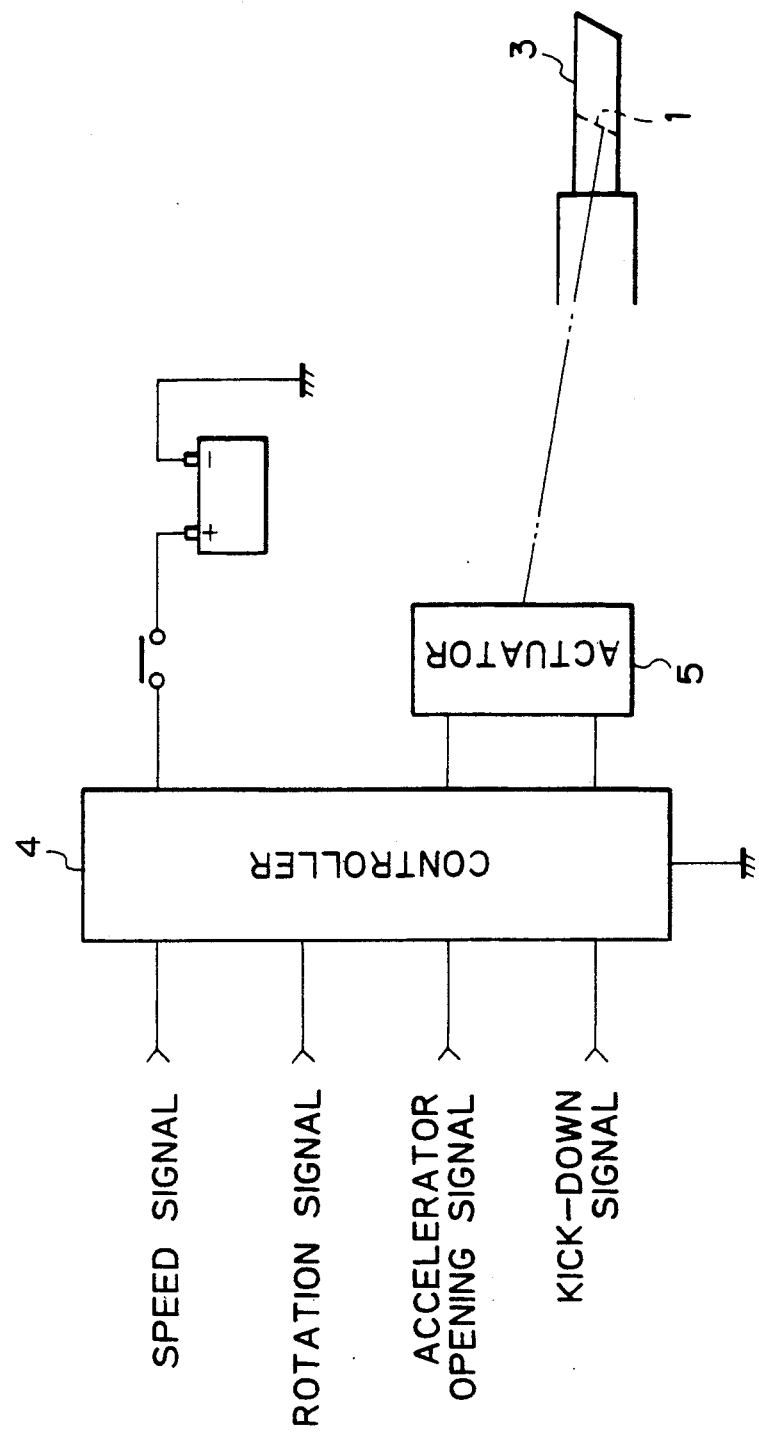
FIG. 6 is a block diagram of a control unit for conducting the second control method of the invention.

FIG. 4 illustrates a flow chart of a second control method described in claim 2. FIGS. 5 (A), (B) and (C) show control patterns conducted in accordance with the second control method of the invention. FIG. 6 is a block diagram of a control unit for conducting the second control method of the invention.

For conducting the control method of the invention, and as shown in FIG. 6 the controller 4 is input by a speed signal indicative of a running speed of the vehicle, a rotational signal indicative of an engine speed, an opening signal indicating that the opening of the accelerator is equal to or above 50%, and a kick-down signal indicating that an automatic transmission has been changed to a lower gear ratio. The controller 4 is designed so as to transmit a drive signal to the actuator 5 for actuating the on-off valve in accordance with the above signals.

Based on the above signals, the controller 4 actuates the on-off valve 3 in one of the three control patterns shown in FIGS. 5 (A), (B) and (C).

First, and when it is determined from the above signals that the vehicle speed is equal to or above a predetermined value (So) and that kick-down of the automatic transmission has not been effected, the controller 4 issues a fourth control pattern shown in FIG. 5 (A).

That is to say when the vehicle speed is no less than the predetermined value (So) and no kick-down of the automatic transmission has been carried out, the on-off valve 3 will be opened if the engine speed is equal to or above a first threshold (Tx1) of a relatively high value, or if the engine speed is no more than the above first threshold but the opening of the accelerator is relatively high, for example no less than 50%.

As a result, except when the engine speed is low and the opening of the accelerator is also relatively low, the on-off valve 3 will be opened so as to restrict increase of back pressure within the engine, thus maintaining the engine output at a sufficient value.

When the engine speed is low and the opening of the accelerator is also relatively low, the on-off valve 3 will be closed, since, in such a case, a loud echo-sound would be generated due to the actuation of an engine braking. In this case, build-up of a high back pressure within the engine would not occur even though the exhaust gas flow passage is narrow, since exhaust gas volume is small.

When it is determined that a kick-down motion has been made to the automatic transmission at any vehicle speeds, the controller 4 assigns a fifth control pattern of FIG. 5 (B) to the on-off valve 3 in the exhaust pipe 1, regardless of the engine speed or the opening of the accelerator, whereby the on-off valve 3 is kept open.

Once a kick-down motion is made to the automatic transmission, the vehicle is then brought into an accelerated condition. In such a case, the exhaust gas passage is provided with a sufficient flow area since the on-off valve 3 is opened, whereby satisfactory engine output can be obtained.

When the vehicle speed is less than the predetermined value (So) and no kick-down motion has been made to the automatic transmission, the controller 4 assigns a sixth control pattern of FIG. 5 (C) to the on-off valve 3. Thus, the on-off valve 3 will be opened when the engine speed is equal to or above a second threshold (Tx2) of a relatively low value, or when the engine speed is less than the second threshold but the opening of the accelerator is relatively high, for example no less than 50%.

As a result, the on-off valve 3 remains open except when the engine speed is low and the opening of the accelerator is also relatively low, thus restricting increase of a back pressure within the engine, whereby satisfactory engine output can be maintained.

When the engine speed is low and the opening of the accelerator is also relatively low, the on-off valve 3 will be closed so as to prevent occurrence of an echo-sound resulting from the actuation of an engine braking. It should be noted that, in such a case, discharge volume of the exhaust gas will be small and hence no build-up of a high back-pressure in the engine might occur even if the area of flow passage of the exhaust gas is small.

With the above construction of the method for controlling the exhaust system of a vehicle in accordance with the present invention, different control patterns are separately assigned to the on-off valve depending upon a running condition of the vehicle. It is therefore possible to obtain an increased output of the engine when the engine speed is very high and hence a large quantity of exhaust gas is discharged, while at the same time preventing occurrence of noisy sounds when a small quantity of exhaust gas is discharged.

We claim:

1. A method for controlling an exhaust system of a vehicle which includes a pair of exhaust pipes arranged in parallel with both other, each of said pipes communicating with an exhaust port of an engine, an on-off valve disposed at an intermediate portion of one of said pair of exhaust pipes, and a controller for controlling an open-close operation of said on-off valve depending upon a running condition of the vehicle, said method including a step of controlling said on-off valve in a first control pattern during an accelerated running condition of the vehicle, a second control pattern during a constant-speed running condition of the vehicle, or a third control pattern during a decelerated running condition of the vehicle said first second and third control patterns being different from each other.

2. The method in accordance with claim 1, wherein the fact whether the vehicle is in said accelerated running condition, in said constant-speed running condition or in said decelerated running condition is determined by means of a vehicle speed signal input into said controller.

3. The method in accordance with claim 2, wherein a vehicle speed signal, an engine speed signal and an accelerator opening signal are input into said controller, and wherein one of said first, second and third control pattern is selected on the basis of said signals.

4. The method in accordance with claim 3, wherein said first control pattern is configured so that said on-off valve is opened when the engine speed is no less than a predetermined level, or when the accelerator opening is no less than a predetermined value, whereas said on-off valve is closed in any other cases.

5. The method in accordance with claim 3, wherein said second control pattern is configured so that the on-off valve remains closed for all engine speeds or accelerator openings.

6. The method in accordance with claim 3, wherein said third control pattern is configured so that the on-off valve is opened when the accelerator opening is no less than a predetermined value, whereas the on-off valve is closed when the accelerator opening is no more than said predetermined value.

7. The method in accordance with claim 4, wherein said predetermined value or threshold of the accelerator opening is 67.5%.

8. The method in accordance with claim 6, wherein said predetermined value or threshold of the accelerator opening is 40%.

9. The method in accordance with claim 3, wherein said first control pattern is configured so that said on-off valve is opened when the engine speed is no less than a predetermined level, or when the accelerator opening is no less than a predetermined value, whereas said on-off valve is closed in any other cases, wherein said second control pattern is configured so that the on-off valve remains closed for all engine speeds or accelerator openings, and wherein said third control pattern is configured so that the on-off valve is opened when the accelerator opening is no less than a predetermined value, whereas the on-off valve is closed when the accelerator opening is no more than said predetermined value.

10. The method in accordance with claim 9, wherein the predetermined value or threshold of the accelerator opening in said first control pattern is 67.5%, and wherein the predetermined value or threshold of the accelerator opening in said third control pattern is 40%.

11. A method for controlling an exhaust system of a vehicle which includes a pair of exhaust pipes arranged in parallel with each other, both of said pipes communicating with an exhaust port of an engine, an on-off valve disposed at an intermediate portion of one of said pair of exhaust pipes, and a controller for controlling an open-close operation of said on-off valve depending upon a running condition of the vehicle, said method including a step of controlling said on-off valve in a first control pattern when the vehicle speed is no less than a predetermined level and a kick-down motion has not been made to an automatic transmission, a second control pattern when a kick-down motion has been made to the automatic transmission, or a third control pattern when the vehicle speed is less than a predetermined level and no kick-down motion has been made to the automatic transmission, said first, second and third control patterns being different from each other.

12. The method in accordance with claim 11, wherein a vehicle speed signal is input to said controller, and wherein the fact whether the vehicle speed is no less than or less than the predetermined level is determined by said controller.

13. The method in accordance with claim 12, wherein a vehicle speed signal, an engine speed signal, an accelerator opening signal and a kick-down signal are input to said controller, and wherein one of said first, second and third control patterns is selected on the basis of said signals.

14. The method in accordance with claim 13, wherein said first control pattern is configured so that said on-off valve is opened when the engine speed is no less than a predetermined level, or when the accelerator opening is no less than a predetermined value, whereas said on-off valve is closed in any other cases.

15. The method in accordance with claim 13, wherein said second control pattern is configured so that the on-off valve remains open for all engine speeds or accelerator openings.

16. The method in accordance with claim 13, wherein said third control pattern is configured so that the on-off valve is opened when the accelerator opening is no less than a predetermined value, whereas the on-off valve is closed when the accelerator opening is no more than said predetermined value.

17. The method in accordance with claim 14, wherein said predetermined value or threshold of the accelerator opening is 67.5%.

18. The method in accordance with claim 16, wherein said predetermined value or threshold of the accelerator opening is 40%.

19. The method in accordance with claim 13, wherein said first control pattern is configured so that said on-off valve is opened when the engine speed is no less than a predetermined level, or when the accelerator opening is no less than a predetermined value, whereas said on-off valve is closed in any other cases, wherein said second control pattern is configured so that the on-off valve remains open for all engine speeds or accelerator openings, and wherein said third control pattern is configured so that the on-off valve is opened when the accelerator opening is no less than a predetermined value, whereas the on-off valve is closed when the accelerator opening is less than said predetermined value.

20. The method in accordance with claim 19, wherein the predetermined value or threshold of the accelerator opening in said first control pattern is 67.5%, and wherein the predetermined value or threshold of the accelerator opening in said third control pattern is 40%.

* * * * *